UNITED STATES PATENT OFFICE.

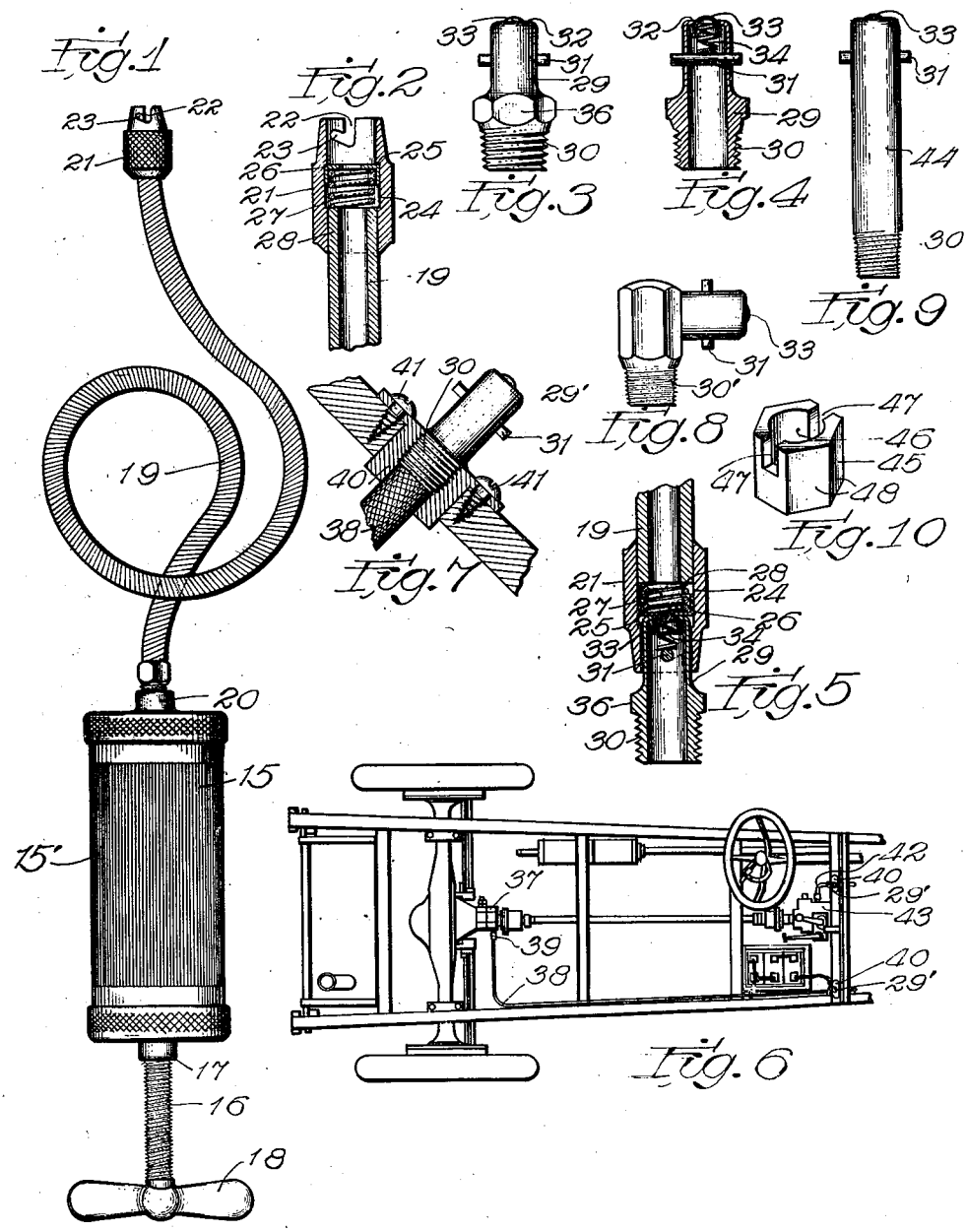

ARTHUR V. GULLBORG, OF CHICAGO, ILLINOIS.

LUBRICATING MEANS.

1,307,734.  Specification of Letters Patent.  Patented June 24, 1919.

Application filed December 21, 1918. Serial No. 267,858.

*To all whom it may concern:*

Be it known that I, ARTHUR V. GULLBORG, a citizen of the United States, residing at Chicago, in the county of Cook and State of Illinois, have invented a certain new and useful Improvement in Lubricating Means, of which the following is a full, clear, concise, and exact description, reference being had to the accompanying drawing, forming a part of this specification.

My invention relates to lubricating means, and is especially concerned with means for supplying suitable lubricants to parts of machines or apparatus requiring lubrication where these parts are difficult to gain access to, and is further concerned with the provision of apparatus for supplying lubricants under pressure to movable parts, the said means comprising a grease pump or gun provided with means for detachably connecting it with the various parts to be lubricated.

The objects of my invention are:

1st. To provide novel means for supplying a lubricant under pressure to the parts of an apparatus to be lubricated, the said means comprising a grease pump or gun and means for detachably connecting the discharge of said grease pump or gun with the part to be lubricated.

2nd. To provide novel coupling means for connecting the grease gun with the parts to be lubricated, the said coupling means being so constructed that when the coupling members are uncoupled or disconnected from each other there will be no excess lubricant on the outer ends of the coupling members.

3d. To provide novel means for effectively sealing the joint between the coupling members so that the lubricant may be forced between the parts to be lubricated under a very heavy pressure.

4th. To provide novel means whereby lubricant may be supplied to parts to which it is difficult to gain access.

5th. To provide novel coupling members to be permanently secured to the parts to be lubricated.

6th. To provide novel means to assist in attaching and detaching a tubular coupling member to a part to be lubricated.

Further objects will appear as the description progresses, reference being had to the accompanying drawing in which, Figure 1 is a side elevation showing my improved grease gun;

Fig. 2 is a longitudinal section through the coupling member thereof;

Fig. 3 is a side elevation of one type of coupling member adapted to be secured to the part to be provided with lubricant and co-acting with the coupling member of my grease gun for connecting the discharge outlet of the grease gun with the part to be lubricated;

Fig. 4 is a longitudinal section of the structure shown in Fig. 3;

Fig. 5 is a longitudinal section through the coupling members shown in Figs. 2 and 4, but taken on a plane at right angles to the section plane of Figs. 2 and 4 showing the two coupling members united;

Fig. 6 is a more or less conventional plan view of an automobile with the body thereof removed showing the novel means which I provide for conveying lubricant to parts ordinarily difficult to gain access to, the front portion of the automobile chassis being broken away;

Fig. 7 is a sectional view showing the means for securing my coupling members to the ends of the conduits for conveying lubricant to the parts difficult of access;

Fig. 8 is a side elevation of a modified form of coupling member;

Fig. 9 is a side elevation of a still further modification of my coupling member; and Fig. 10 is a perspective view of the means which I employ for rotating the coupling members shown in Fig. 9 in either direction to attach it to or detach it from the part to be provided with a lubricant.

Similar characters of reference refer to similar parts throughout the several views.

Referring to the drawings, the reference character 15 indicates the barrel of my improved grease gun or pump which is provided in a wellknown manner with a plunger, not shown, which is reciprocated in the barrel 15 by means of a screwthreaded piston rod 16 which co-acts with a screwthreaded nut 17, the piston 16 being provided with a handle 18. The barrel 15 is provided with ribs or corrugations 15' to insure a firm grip of the hand thereon. A flexible conduit 19, of any suitable and wellknown construction, has one end secured to the discharge outlet 20 of my pump and the other end is provided with a hollow coupling member, indicated in general by the reference character 21. The free end of this coupling member, as shown in Fig. 2, is provided with a bayonet slot 22, the transverse portion 23 of which is inclined from the inner end of the longitudinal portion of the slot toward the outer end of the coupling member for a purpose which will be referred to later on. The bore of the coupling member is enlarged at 24 to provide an annular shoulder 25. A perforated cup leather or sealing disk 26 is slidably mounted in the annular portion 24 of the bore of the coupling and is urged against the shoulder 25 by means of a coiled spring 27, one end of which abuts against the cup leather or sealing disk 26 and the other end of which abuts against the adjacent end 28 of the conduit 19. This end of the conduit may be soldered or secured in any convenient manner to the coupling member.

Referring to Figs. 3 and 4, the reference character 29 indicates as a whole a second coupling member which co-acts with the coupling member just described. This coupling member is in general tubular in form and is provided at one end with screwthreads 30 for securing it to the part to be lubricated. A pin 31 extends through and projects from the opposite sides of the other end of the tubular member. This end of the tubular member is flanged inwardly, as indicated at 32, to form a valve seat with which the hollow capsule shaped valve 33 co-acts. A spring 34 interposed between the pin 31 and the hollow valve 33 urges the latter against the valve seat 32. My purpose in making the valve 33 hollow is, first, to provide sufficient room for the spring 34 without materially increasing the length of the coupling member, and, second, to provide means which will tend to prevent the spring 34 from buckling or flexing longitudinally when the valve 33 is pushed inwardly to admit the lubricant. My invention contemplates the provision of facets 36 to receive the jaws of a wrench whereby the coupling member may be attached to or detached from the parts to be lubricated.

In Fig. 5 I have shown the coupling members 21 and 29 coupled together. In this position it will be noted that the spring 27 is partially compressed and that the sealing disk 26 is displaced from the annular shoulder 25 by the end of the coupling member 29. When the piston of the gun pump is actuated to force lubricant through the conduit 19 under pressure this pressure will cause the sealing disk 26 to seal the joint between the two coupling members and thus prevent any escape of lubricant over the sides of the coupling member 29. On account of the fact that the transverse portion 23 of the bayonet slot in the coupling member 21 is inclined toward the open end of this coupling member it is necessary in order to detach this coupling member from the coupling member 29 to move it toward the coupling member 29. This movement causes an additional small quantity of lubricant to be forced into the coupling member 29. When the coupling member 21 is then turned to permit the pin 31 to slide in the longitudinal portion of the slot 22 the sealing disk 26 is moved toward the end of the coupling member 29 under the pressure of the spring 34. This causes the sealing disk 26 to move toward the outer end of the coupling member 21 and thereby produces a slight vacuum which causes any grease which might otherwise remain on the outer end of the coupling member 29 or the outer side of the valve 33 to be sucked back behind the sealing disk 26, and thereby prevents any excess of lubricant from remaining on the end of the coupling member 29 or on the outside of the valve.

From the above description it will be seen that I have provided means for conveying a lubricant to the part or parts to be lubricated which not only prevents the loss of lubricant, even though the lubricant may be forced between the bearing surfaces under very high pressure, but also prevents the lubricant from remaining upon exposed portions of the coupling members after these have been uncoupled, and subsequently lost. This feature is of importance where, as I will describe later on, the coupling members are located at readily accessible points and where, in case the parts being lubricated form a part of a motor vehicle or other similar structure, the clothes of the operator are likely to come in contact with these coupling members.

Referring to Fig. 6 in which I have disclosed a portion of a motor vehicle with the body thereof removed, the reference character 37 indicates a bearing in the differential casing which is supplied with lubricant by a conduit 38 connected therewith by a suitable hollow coupling 39. The other end of the conduit 38 is brought forwardly in the vehicle and is secured to either the dash or the instrument board, as may be found convenient, by means of a floor socket 40, shown in detail in Fig. 7, which is secured in place by means of the screws 41 and is provided with an internal screwthread for receiving the screwthreaded portion 30 of a coupling member 29'. This coupling member 29' is similar to that shown in Figs. 3 and 4, except that it is not provided with the facets 36 for receiving the jaws of a wrench. The forward end of the conduit 38 may be soldered or otherwise secured in the socket 40. The reference character 42 indicates another conduit for conducting oil from the coupling member 29' to the transmission housing 43.

While I have illustrated means for conducting lubricant to but two portions of this automobile vehicle it is to be understood that conduits similar to 38 and 42 may be used for conducting lubricant to any portion of the vehicle which it is desired to lubricate. Furthermore, this feature of my invention is not to be limited to means for lubricating motor vehicles, but is capable of being used for lubricating any apparatus whether the parts to be lubricated are or are not difficult of access.

In Fig. 8 I have shown a modified form of a coupling member to be secured to a part to be lubricated. This coupling member is L shaped and one end thereof is provided with screwthreads 30′ and the other end thereof being provided with a pin 31 and a spring-pressed valve or closure 33 similar to that described in connection with Figs. 3 and 4. The purpose of this coupling member is to provide means for connecting the coupling member 21 with a part to be lubricated which would otherwise be difficult of access if provided with a straight coupling member such as that shown in Figs. 3 and 4.

In Fig. 9 I have disclosed a still further modification of my coupling member wherein it is formed from a tubular member 44 of substantially constant diameter which is not provided with means for co-acting with a wrench to attach or detach it to the part to be lubricated. In order to thus attach or detach this member I provide the means illustrated in Fig. 10. This means comprises a sleeve-like member 45 having a bore 46 therein for receiving the tubular member 44 and slots 47 for receiving the ends of the pin 31 of the tubular member 44. The member 45 is provided with facets 48 for co-acting with a wrench or other tool for rotating this sleeve.

While I have described the preferred embodiments of my invention it is to be understood that it is capable of other adaptations and modifications within the scope of the appended claims.

Having thus described my invention what I claim as new and desire to secure by Letters Patent of the United States is:

1. The combination with a hollow coupling member having a pin projecting from one side thereof and a spring-pressed closure, of a pump having a flexible conduit connected with the outlet thereof, a second hollow coupling member secured to the other end of said conduit for receiving the closed end of said first named coupling member and provided with a bayonet slot for receiving said pin, the transverse portion of said slot being inclined from the longitudinal portion thereof toward the outer end of the coupling member, the bore of said coupling member being enlarged to provide a shoulder, a perforated sealing disk slidably mounted in the enlarged portion of said bore, and a spring confined between the ends of said conduit and said disk for urging said disk against said first named coupling member.

2. The combination with a hollow coupling member having a pin projecting from one side thereof and a spring-pressed closure, of a pump, a discharge conduit having one end secured to the outlet of said pump, a second hollow coupling member for receiving the closed end of said first named coupling member secured to the other end of said conduit and provided with a bayonet slot adapted to co-act with said pin, a perforated sealing disk mounted to reciprocate in the bore of said coupling member, means for yieldingly urging said sealing disk against the closed end of said first named coupling member, and means for limiting the movement of said sealing disk in the direction of said second coupling member.

3. The combination with a hollow coupling member having a spring-pressed closure, of a pump, a discharge conduit having one end secured to the outlet of said pump, a second hollow coupling member for receiving the closed end of said first named coupling member secured to the other end of said conduit, a perforated sealing disk mounted to reciprocate in the bore of said coupling member, means for yieldingly urging said sealing disk against the closed end of said first named coupling member, and means for limiting the movement of said sealing disk toward said second coupling member.

4. The combination with a hollow coupling member having a spring-pressed closure, of a pump, a discharge conduit having one end secured to the outlet of said pump, a second hollow coupling member for receiving the closed end of said first named coupling member secured to the other end of said conduit, a perforated sealing disk mounted to reciprocate in the bore of said coupling member, and means for yieldingly urging said sealing disk against the closed end of said first named coupling member.

5. The combination with a pump having a flexible conduit connected with the outlet thereof, of a hollow coupling member secured to the other end of said conduit and provided with a bayonet slot, the transverse portion of said slot being inclined from the longitudinal portion thereof toward the outer end of the coupling member, the bore of said coupling member being enlarged to provide a shoulder, a perforated sealing disk slidably mounted in the enlarged portion of said bore, and a spring confined between the ends of said conduit and said disk for urging said disk toward said shoulder.

6. The combination with a pump having a discharge outlet, of a coupling member connected with said discharge outlet and provided with a bayonet slot, the transverse portion of said slot being inclined from the inner end of the longitudinal portion thereof toward the outer end of said coupling member, a perforated sealing disk slidably mounted in the bore of said coupling member, and means for yieldingly urging said sealing disk toward the outer end of said coupling member, and means for limiting the movement of said sealing disk toward the outer end.

7. The combination with means for supplying lubricant under pressure, said means comprising a discharge outlet, of a coupling member connected with said discharge outlet, a perforated cup leather slidably mounted in said coupling member, and means for yieldingly urging said cup leather toward the outer end of said coupling member.

8. The combination with an apparatus having a part to be lubricated, of a conduit for conducting lubricant to said part, a coupling member secured to the end of said conduit and provided with a spring-pressed valve closure, means for supplying lubricant to said conduit comprising a receptacle provided with a discharge outlet, a second coupling member connected with said discharge outlet, means for detachably uniting said coupling members, and means for sealing the joint between said coupling member and for removing excess lubricant from the adjacent ends thereof when said coupling members are uncoupled.

9. The combination with an apparatus having a part to be lubricated, of a conduit for conducting lubricant to said part, a coupling member secured to the end of said conduit and provided with means for supplying lubricant to said conduit comprising a receptacle provided with a discharge outlet, a second coupling member connected with said discharge outlet, means for detachably uniting said coupling members, and a pliable gasket for sealing the joint between said coupling members.

10. The combination with an apparatus having a part to be lubricated, of a conduit for conducting lubricant to said part, a coupling member secured to the end of said conduit and provided with means for supplying lubricant to said conduit comprising a receptacle provided with a discharge outlet, a second coupling member connected with said discharge outlet, and means for detachably uniting said coupling members and for removing excess lubricant from the adjacent ends thereof when said coupling members are uncoupled.

11. The combination with a bearing provided with a member for receiving lubricant, of means for supplying lubricant thereto comprising a hollow member, means for supplying lubricant to said hollow member under pressure, means for detachably connecting said members, and means for sealing said connection comprising a gasket positioned between said members and held against one of said members by the pressure of the lubricant.

12. The combination with a bearing provided with a member for receiving lubricant, of means for supplying lubricant thereto comprising a hollow member, means for supplying lubricant to said hollow member under pressure, means for detachably connecting said members, means for sealing said connection, comprising a gasket positioned between said members and held against one of said members by the pressure of the lubricant, and a spring for initially positioning said gasket against said member.

13. The combination with a receptacle for receiving lubricant, of means for supplying lubricant to said receptacle comprising a hollow member, means for forcing lubricant into said hollow member under pressure, and means for connecting said hollow member to said receptacle in fluid-tight relation comprising a pliable member positioned in said hollow member and having one face for contacting with said receptacle, the other face of said pliable member being subjected to the pressure of the lubricant in said hollow member.

14. The combination with a grease cup comprising a tubular member having one end flanged inwardly to provide a closure seat, a closure, a pin extending through said tubular member and from both sides thereof, and a spring confined between said pin and closure, and tending to hold said closure on its seat, of a grease pump having a discharge conduit, and means co-acting with the ends of said pin for detachably connecting the discharge end of said conduit with said grease pump.

15. The combination with a grease cup comprising a tubular member having a closure seat, a closure, a pin extending through said tubular member and from both sides thereof, and a spring confined between said pin and closure, and tending to hold said closure on its seat, of a grease pump having a discharge conduit, and means co-acting with the ends of said pin for detachably connecting the discharge end of said conduit with said grease cup.

16. The combination with a grease gun having a discharge conduit, of means for connecting said conduit with a bearing comprising a tubular member, co-acting means on said conduit and said tubular member for detachably connecting said conduit and tubular members, and a flexible member for sealing the joint between said conduit and said tubular member, said flexible member having an aperture for the passage of lubricant from said conduit to said tubular member, a portion of one face of said flexible member being positioned so as to be subjected to any pressure created in said conduit to force it against said tubular member.

17. The combination with means for supplying lubricant under pressure comprising a discharge member, of means for connecting said discharge member to a bearing comprising a tubular member, and means for detachably connecting said members in sealed relation comprising means subjected to the pressure created in said members, the said means being positioned between said members and held against one of said members by said pressure.

18. The combination with a member for receiving lubricant, of means for supplying lubricant thereto under pressure comprising a tubular member, means for detachably connecting said tubular member to said lubricant-receiving member in sealed relation comprising a flexible member provided with an aperture for the passage of lubricant, one face of said member being subjected to the pressure of the lubricant.

In witness whereof, I hereunto subscribe my name this 14th day of December, 1918.

ARTHUR V. GULLBORG.

Witnesses:
JOHN E. CARLSON,
JOHN L. STEFFEN.

DISCLAIMER.

1,307,734.—*Arthur V. Gullborg*, Chicago, Ill. LUBRICATING MEANS. Patent dated June 24, 1919. Disclaimer filed August 29, 1927, by the assignee by mesne assignments, *The Bassick Manufacturing Company*.

Hereby enters this disclaimer to that part of the claims in said specification which is in the following words, to wit:

"12. The combination with a bearing provided with a member for receiving lubricant, of means for supplying lubricant thereto comprising a hollow member, means for supplying lubricant to said hollow member under pressure, means for detachably connecting said members, means for sealing said connection comprising a gasket positioned between said members and held against one of said members by the pressure of the lubricant, and a spring for initially positioning said gasket against said member."

[*Official Gazette September 13, 1927.*]